United States Patent [19]
Jacobson et al.

[11] Patent Number: 6,070,157
[45] Date of Patent: *May 30, 2000

[54] METHOD FOR PROVIDING MORE INFORMATIVE RESULTS IN RESPONSE TO A SEARCH OF ELECTRONIC DOCUMENTS

[75] Inventors: Guy Jacobson, Bridgewater; Balachander Krishnamurthy, Chatham; Divesh Srivastava, Summit, all of N.J.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,515

[22] Filed: Sep. 23, 1997

[51] Int. Cl.⁷ ......................................................... G06F 17/30
[52] U.S. Cl. ........................ 707/1; 707/3; 707/4; 707/200
[58] Field of Search ................................. 707/1, 3, 4, 200

[56] References Cited

U.S. PATENT DOCUMENTS

| | | | |
|---|---|---|---|
| 5,375,235 | 12/1994 | Berry et al. | 395/600 |
| 5,675,788 | 10/1997 | Husick et al. | 395/615 |
| 5,724,567 | 3/1998 | Rose et al. | 707/3 |
| 5,745,894 | 4/1998 | Burrows et al. | 707/5 |
| 5,802,518 | 9/1998 | Kareav et al. | 707/9 |
| 5,983,216 | 11/1999 | Kirsch et al. | 707/2 |

*Primary Examiner*—Paul R. Lintz
*Assistant Examiner*—Jean Bolte Fleurantin
*Attorney, Agent, or Firm*—Kenyon & Kenyon

[57] ABSTRACT

A method provides a more informative result to a user in connection with the search for documents in a database. In particular, the method provides augmented addresses, in the Internet environment augmented universal resource locators, which include an indication of a document attribute which may be of interest to the user. Such attributes may include an indication of the language of the document (e.g., English or Japanese) or the popularity of the document.

21 Claims, 3 Drawing Sheets

METHOD FOR PROVIDING MORE INFORMATIVE RESULTS IN RESPONSE TO A SEARCH OF ELECTRONIC DOCUMENTS

BACKGROUND OF THE INVENTION

The present invention is directed to a method for providing more informative results in response to a search of electronic documents. In particular, the present invention is directed to a method for providing document attribute information together with document addresses as part of the presentation of the results of a database search.

The use of the Internet as an information resource continues to grow. More and more information sites or servers are connected to the Internet and information seekers conduct more and more searches in this database. The searches are typically performed by search engines such as Alta Vista, Yahoo, and others. These search engines are adapted to receive queries from users where the queries incorporate certain key words. Typically, when a search engine presents the results of the search, it provides an identification of the documents found as a consequence of the search. The identification may include a document title and typically includes an identification of the address of the document. In the Internet environment this address is the Universal Resource Locator (URL) that is associated with the web page or document found by the search engine. It is also common to provide the user with a quick way of getting to the cited web page such as by providing a link, such as a hypertext link, to that web page in connection with the search results. It would be beneficial if the search engine returned additional information beyond the address of the document so that the user will be better informed for selecting among a plurality of documents identified as being responsive to the search query.

SUMMARY OF THE INVENTION

The present invention is directed to a method for providing more informative results to a user in connection with the search of a database. In particular, the present invention provides a method by which the user is provided not only with an address of a document responsive to a search request, but also attribute information regarding that document. In the Internet environment search engines typically return URLs. The present invention provides a method for augmenting these URLs to incorporate document attribute information thereby providing the end user with a more informative set of results to the search conducted in the database. In accordance with the invention the search engine or indexer may identify a document attribute and index that document. The indexer could then associate both the index and the document attribute with the document address. Then, when the search engine receives a query, the engine searches for query results and presents the address and the document attribute in reporting results.

In a modification of the present invention the search engine is adapted to receive not only a key word search query but also an identification of a desirable document attribute. The search engine then searches the database based on the search query and presents addresses of documents satisfying the query including satisfying the desired document attribute.

As a result, the present invention provides an improved presentation of information to a user interested in finding documents having certain characteristics among documents stored in a database.

DETAILED DESCRIPTION

Figure 1:
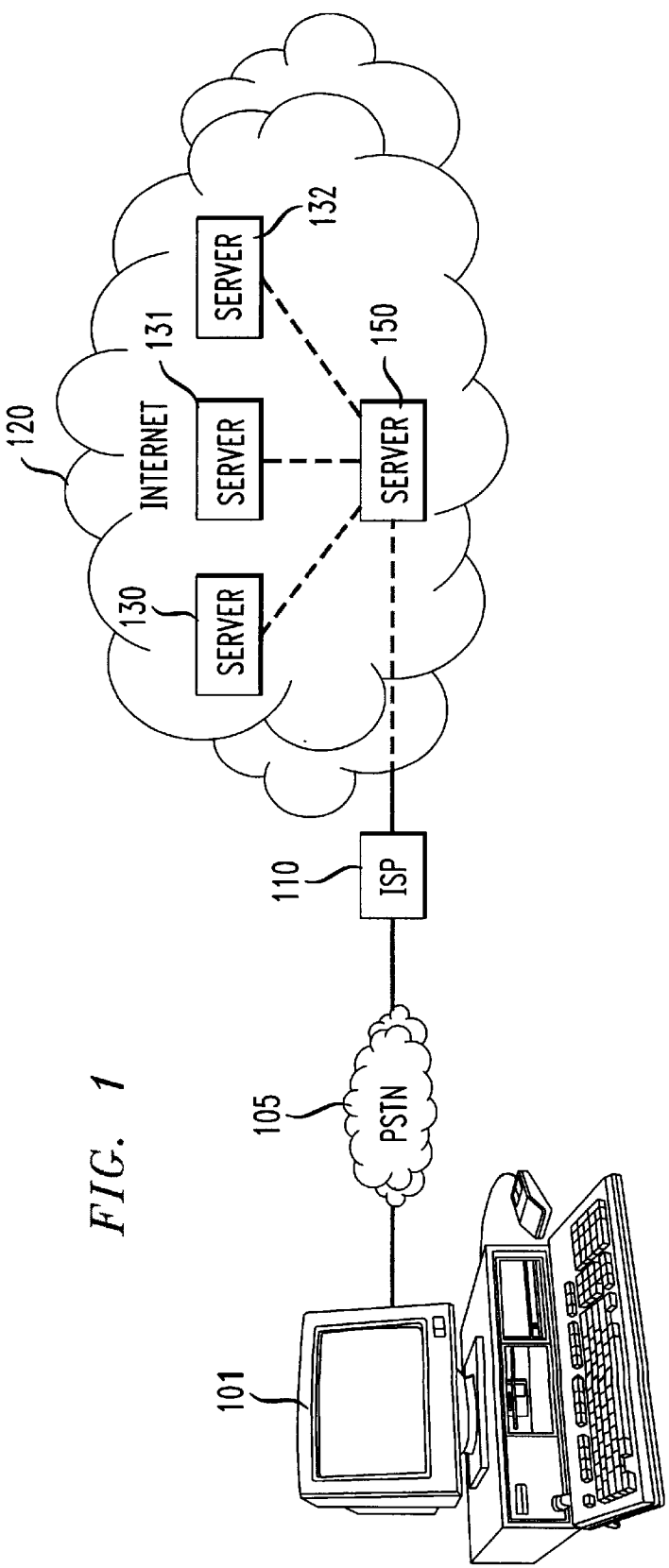
FIG. 1 illustrates, in schematic form, a network in which the present invention may be employed.

In accordance with the present invention a user is presented with more information about a document that satisfies a search request or search query. In particular, the user can be provided not only with an address of a document that satisfies the query but also information that defines an attribute of the document. Thus, the address is augmented.

As an example, a search engine which operates in conjunction with a particular database may receive a search query from a user. The engine will then search the database, typically using indexes of documents already created by the search engine in advance of the search. When the search engine finds a document that matches the search request based on some predetermined criteria, then the search engine can present an identifier of the document, typically an address of the document to the search requester. In addition to the address, the engine would report an attribute that it has detected about the document and associated with the document address. As an example, it is possible that a particular document or page is mirrored or appears in two or more places in the database. For instance in connection with a database such as the World Wide Web in the Internet, the same document could appear at different web sites that are geographically diverse from one another. Furthermore, the same document could appear in different languages at either the same web site or at different web sites. The document attribute associated with the address in connection with the present invention can reflect such things as the physical or geographic location of the web site such that a party could choose a more geographically proximal site. Alternatively, it could designate the language of the document so that a user could select the appropriate language of the document for better use. Other information that could be attributed to the document includes an indication of the popularity of the document. This could be reflected by an indication of the number of pages in the database to which the document is linked. The popularity could also be reflected by the number of times that the document has been accessed as part of a response to previous search requests.

The above are merely examples of the types of attributes which might be associated with the document. It is expected that those skilled in the art could identify other attributes of documents which would also be informative to users and which could supplement the basic address information that is provided in response to a search request so as to provide the user with additional information for selecting among a plurality of responses.

A system in which the present invention may be employed will now be described in connection with FIG. 1. A user may have access to a database such as web sites on Internet 120 via a processing device such as a personal computer 101. The personal computer can be coupled to the database via any of a number of known network configurations. One such configuration would include coupling the PC to the public switch telephone network (PSTN) 105 via some modem or data communications channel connection. The personal computer would then be connected via the PSTN to an Internet service provider (ISP) 110. The ISP provides the user with access to the database, in this instance Internet 120. In the Internet reside a plurality of servers (130, 131, and 132 as examples). Each server may have, residing on it one or more web sites. Each site may constitute one or more documents referred to as pages. Since the database may include hundreds and thousands of documents when one considers the compilation of all pages on all of the servers in the network, typically a user employs a search engine residing at yet another server, in this example server 150, to search among the documents on the database to find information responsive to a search query. Co-pending applications A METHOD FOR IMPROVING THE RESULTS OF A SEARCH IN A STRUCTURED DATABASE; A METHOD OF CLUSTERING ELECTRONIC DOCUMENTS IN RESPONSE TO A SEARCH QUERY; and A METHOD FOR USING REGION-SETS TO FOCUS SEARCHES IN HIERARCHICAL STRUCTURES (all three filed on even date herewith), relate to the concept of conducting searches in response to search queries. The subject matter of these applications is hereby incorporated by reference.

In the configuration shown in FIG. 1, the user can enter a search query via PC 101 and that search query can be transported to the search engine associated with server 150. In a typical search engine operation, the search engine will have previously conducted an indexing operation with respect to documents residing in the database. An example of an indexing operation is described in co-pending application A METHOD FOR EFFECTIVE INDEXING OF PARTIALLY DYNAMIC DOCUMENTS (filed on even date herewith), which is hereby incorporated by reference. In performing that indexing operation the search engine may employ an indexer or spider which periodically retrieves copies of documents from the various web sites and indexes them according to the information contained in the documents. Typically, the server then stores an index of a document along with an address associated with the document.

Figure 2:
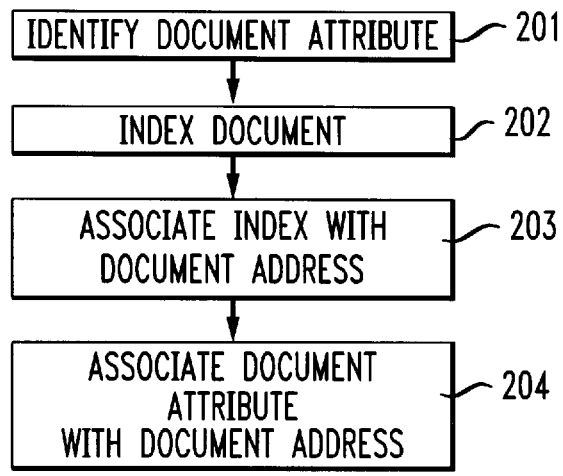
FIG. 2 provides a flow chart for indexing documents in a database in accordance with the present invention.

In accordance with the present invention the indexing operation can be modified so as to provide additional information to the user upon retrieval of a document in response to a search query. In particular, as shown by the flowchart of FIG. 2, the indexer may identify a document attribute while it is conducting its indexing operation, step 201. Then, the indexer can index the document in accordance with normal indexing procedures, step 202. The last two steps of the flow chart of FIG. 2 are interchangeable. As shown, step 203 associates the index with the document address while step 204 then associates the document attribute which was identified in step 201 with the document address as well, step 204. At that time the indexed version of the document thus has associated with it the address and some additional document attribute which will be beneficial to the user in selecting among a plurality of responses supplied in answer to the search request. Examples of those attributes have been described above and include such things as geographical position of the document or web site on which the document resides or the language of the document.

Figure 3:
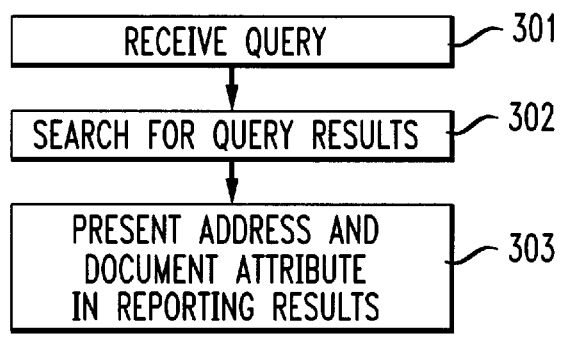
FIG. 3 provides a flow chart for searching for documents in connection with the present invention.

FIG. 3 illustrates a flow chart for presenting the results of a search in accordance with an embodiment of the present invention. In particular, the search engine will receive a query from a user, step 301. That query can be a designation of one or more key words which are of interest to the searching party. The search engine will then search for query results, step 302. Typically, the search engine would employ the indices created in connection with the process flow of FIG. 2. The search engine would analyze the indices and identify those documents which include matches for the key words found in the query. Then, in accordance with the present invention, the search engine would present results 303 to the user identifying the address of a document that satisfies the query request and providing along with the address an indication of the document attribute which was earlier detected in connection with the flow of FIG. 2. Thus, the user will be advised not only of the address for purposes of accessing a document which is responsive to the query and may be of interest to the user, but is also provided with additional information that will assist the user in selecting as between a plurality of documents supplied in response to the query.

Figure 4:
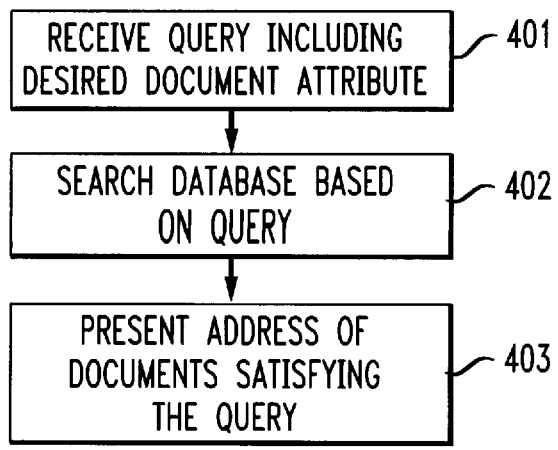
FIG. 4 provides a flow chart for searching for documents in accordance with another embodiment of the present invention.

FIG. 4. illustrates a process flow representative of a modification of the present invention. In this particular flow the received query includes a desired document attribute, step 401. Then, when the search engine conducts the search using the query it refers not only to any key words included in the query which would be compared against the index, but also then checks for document attributes associated with the addresses of the documents that have been indexed, step 402. As a consequence, the search engine can then present the address of documents that satisfy the query 403, with or without an identification of the document attributes because the user already knows that the presented documents satisfy the desired document attributes specified in connection with the search query. This modification thus presents an automatic filtering of the documents which are otherwise responsive to a key word search where the filter is defined by the user who specifies a document attribute associated with the addresses of the indexed documents.

Figure 5:
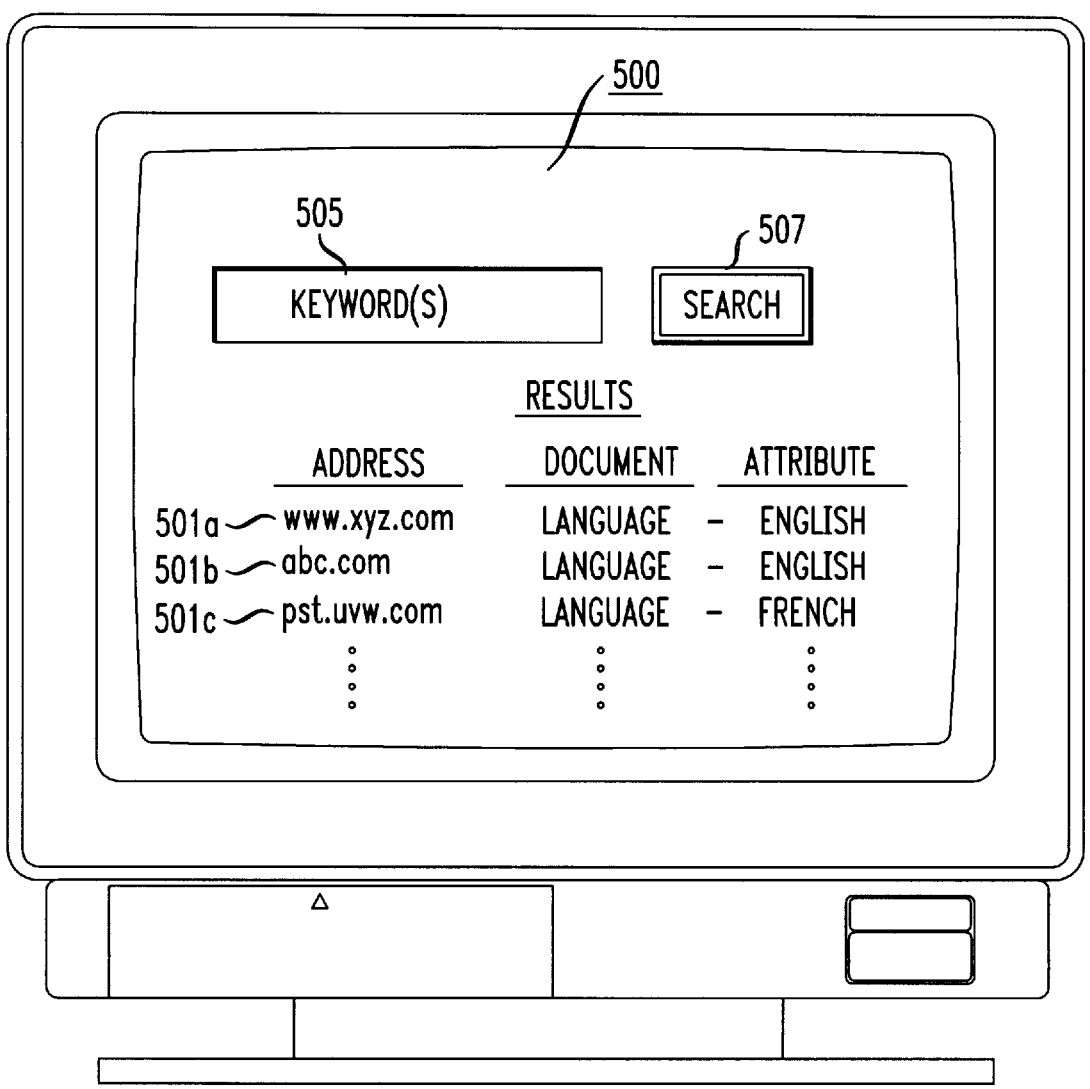
FIG. 5 provides an illustration of a sample presentation of search results in accordance with the present invention.

An example of a presentation of the results of a key word search is shown in FIG. 5. A search results page 500 includes a listing of results that includes elements 501*a*, 501*b*, and 501*c*. Each of the entries in the listing of the results includes the address of a document of interest as well as some document attribute which may be of interest. In this example the document attributes listed identify the language of the document. The results page can also show the key word or words utilized in the search, 505 as well as provide a searching button or link 507 which, upon selection causes a search based on the key words to be activated. To implement the modification referred to in connection with FIG. 4, an additional viewing window or segment may be provided to display the document attribute which the user has entered as a desired attribute in connection with the query or search request.

As described above, the document attribute can reflect not only language and geographical positioning or a document but also the relative popularity of a document with respect to other documents on the database, or the relative frequency with which the document is accessed by users. It is expected that those of ordinary skill in the art could identify one or more document attributes which may be of interest to users who seek to be more informed before selecting among a plurality of documents provided in response to a key word search or query.

The search engine employing the present invention is expected to employ general purpose computing capabilities controlled by specific software implementing the functionality described above with reference to the attached flow diagrams. Furthermore, it should be recognized that the present invention is not limited to the Internet domain. It is equally applicable in other compilations of documents at one or more locations where it is beneficial to the user to provide some additional information about the documents which is not typically discernable merely through a key word search. Thus, the present invention provides more informative results to a user who is conducting searches along a database so that a selection among a plurality of documents which might be relevant can be more readily made.

What is claimed is:

1. A method for providing more informative results in response to a search of electronic documents in an unstructured database, where each document has a document address associated therewith, the method comprising the steps of:

associating a parameter field with a document address of an electronic document;

determining an attribute of said electronic document;

storing said determined attribute in said parameter field;

receiving a search request including a desired attribute;

for each of a plurality of electronic documents comparing said desired attribute to said determined attribute in the parameter field for that document; and presenting, as a search result, the document address of an electronic document having a determined attribute matching said desired attribute.

2. The method of claim 1 wherein said determined attribute identifies the language of the associated document.

3. The method of claim 1 wherein said determined attribute identifies a geographic location of a source for the associated document.

4. The method of claim 1 wherein said determined attribute defines a relative popularity of the corresponding document.

5. In a method for searching for electronic documents in an unstructured database in response to a search query containing at least one keyword, an improvement comprising:

associating an attribute of an electronic document with a document address for that document;

identifying a document responsive to the search query; and presenting the document address and associated attribute of the identified electronic document.

6. The improvement of 5 wherein said attribute identifies the language of the corresponding document.

7. The improvement of claim 5 wherein said attribute identifies a geographic location of a source for the corresponding document.

8. The improvement of claim 5 wherein said attribute identifies a relative popularity of said corresponding document.

9. The improvement of 8 wherein said relative popularity of a given document is defined in terms of the number of other electronic documents providing links to that given document.

10. The improvement of claim 8 wherein said relative popularity of a given document is defined in terms of the number of times the document has been identified as a result of a search over a predetermined time interval.

11. In an unstructured database, a method for identifying an electronic document in response to a search request, the method comprising the steps of:

augmenting a universal resource locator (URL) of a document to reflect an attribute of that document;

determining a plurality of electronic documents to be responsive to a given search request; and presenting as a search result the augmented URL for each document having an augmented URL which is identified to be responsive to the search request.

12. The method of claim 11 wherein said attribute of the augmented URL reflects a geographic location of the source of the corresponding identified document.

13. The method of claim 11 wherein said attribute of the augmented URL reflects a language of the corresponding identified document.

14. The method of claim 11 wherein said attribute of the augmented URL reflects a relative popularity of the corresponding identified document.

15. The method of claim 14 wherein said attribute of the augmented URL identifies the number of other documents providing links to the corresponding identified documents.

16. The method of claim 14 wherein said relative popularity of a given document is defined in terms of the number of times the document has been identified as a result of a search over a predetermined time interval.

17. A method for searching for electronic documents in an unstructured database, the method comprising the steps of:

receiving a search query including a keyword and a document attribute;

comparing said search query to a plurality of documents, said step of comparing comprising the steps of, for each of the plurality of documents determining whether the document includes said keyword; and determining whether the document satisfies the document attribute identified in said search query; and presenting, in the results of the search, the document address of each document that is found to satisfy the search query during said step of comparing.

18. The method of claim 17 wherein said document address constitutes a universal resource locator (URL).

19. The method of claim 18 wherein said results include an augmented URL for each document that is found to satisfy the search query, said augmented URL including the URL of the document and an attribute of the document.

20. The method of claim 17 wherein said step of presenting includes providing an attribute of the document that is found to satisfy the search query during said step of comparing.

21. The method of claim 20 wherein the attribute presented in said step of presenting differs from said attribute in said search query.

* * * * *